United States Patent [19]

Alberts et al.

[11] 3,993,710

[45] Nov. 23, 1976

[54] POLYMERIZABLE ORGANIC DISPERSIONS

[75] Inventors: Heinrich Alberts, Cologne; Klaus Schuster, Opladen; Herbert Bartl, Odenthal-Hahnenberg; Hansjochen Schulz-Walz, Krefeld, all of Germany

[73] Assignee: Bayer Aktiengesellschaft, Germany

[22] Filed: June 24, 1975

[21] Appl. No.: 589,949

[30] Foreign Application Priority Data

June 29, 1974 Germany............................ 2431410
Oct. 18, 1974 Germany............................ 2449581

[52] U.S. Cl............................. 260/862; 260/29.6 R; 260/29.6 TA; 260/29.6 H; 260/29.6 SQ; 526/303; 526/318; 526/320; 526/324; 526/329; 526/331; 526/72
[51] Int. Cl.².................. C08L 23/08; C08L 67/06
[58] Field of Search.................................... 260/862

[56] References Cited

UNITED STATES PATENTS

| 3,331,796 | 7/1967 | Gilbert et al............... | 260/862 X |
| 3,397,169 | 8/1968 | Wilkinson..................... | 260/862 X |

FOREIGN PATENTS OR APPLICATIONS

| 1,148,285 | 12/1957 | France |
| 1,241,983 | 6/1967 | Germany |
| 2,305,246 | 9/1973 | Germany |

*Primary Examiner*—Murray Tillman
*Assistant Examiner*—W. C. Danison, Jr.
*Attorney, Agent, or Firm*—Connolly and Hutz

[57] ABSTRACT

Dispersions suitable for the manufacture of moulding compositions which can be cured with low shrinkage to give mouldings with excellent surfaces can be obtained by the addition of finely divided ethylene copolymers manufactured in aqueous emulsion to unsaturated polyester resins.

5 Claims, No Drawings

POLYMERIZABLE ORGANIC DISPERSIONS

The present invention relates to dispersions which are suitable for the manufacture of moulding compositions which can be cured with little shrinkage to give mouldings free from surface deposits, and which are based on unsaturated polyesters, copolymerisable compounds and ethylene polymers manufactured in aqueous emulsions.

Conventional heat-curable polyester resins show a considerable shrinkage on polymerisation and this shrinkage is a serious disadvantage in the manufacture of mouldings which are required to have a perfect surface. Now it is known from numerous publications (for example DT-OS (German Published Specifications) 1,192,820, 1,694,857, 1,803,345, 1,953,062, 2,051,663, and 2,061,585 and French Patent Specification 1,148,285) that polyester moulding materials to which certain thermoplastics have been added before curing can be cured with little shrinkage. Examples of thermoplastics suitable for this purpose which have been proposed are homopolymers or copolymers of styrene, polyacrylates, polymethacrylates, cellulose esters and polyethylene. Whilst these additives reduce the shrinkage on polymerisation they are — with the exception of polyethylene- soluble in the polyester/monomer systems or can only be combined with these systems to form an emulsion. Such resin compositions as a rule have an undesirably high viscosity which makes it substantially more difficult to process the resins, for example by incorporating fillers therein, and causes the conveying and homogenisation of these resins to be time-consuming and technically unnecessarily difficult processes.

Where the polyester resin/thermoplastic systems tend to demix, the components must only be combined shortly before conversion to mats since otherwise a non-uniform distribution in the resin mats results. In general, a part of the thermoplastic sweats out during the ripening of the mats and this leads to the mats having a tacky surface and hence to difficulty in pulling off the release films usually employed. The consequence of this is that the surfaces of the mouldings are of poor quality, with matt patches, and that surface deposits form on the tool.

Most of the previously known polyester resins which can be cured with little shrinkage assume an intense white colour during curing. This phenomenon produces a more or less pronounced lightening of the colour shade, depending on the thickness of the mouldings, so that it is no longer possible to uniformly colour mouldings of varying thickness.

Even if polyethylene which is insoluble in the polyester/monomer systems is used as a shrinkage-reducing additive, the inadequate compatibility of these resins with glass fibres, and the poor surfaces and non-uniform colouration of the mouldings, are disadvantages which stand in the way of the successful use of such resin compositions (compare also German Patent Specification 1,241,983, column 1, lines 30–43).

German Patent Specification 1,241,983 has disclosed a process for the manufacture of moulding compositions, based on unsaturated polyesters and copolymerisable monomers, which can be cured with little shrinkage to give mouldings which are free from strain and which have good compatibility with glass fibres; these moulding compositions contain 10–90% by weight of ethylene/vinyl acetate copolymers as the thermoplastic additive. As is stated in the description, copolymers containing 10 – 98% by weight of vinyl acetate can be employed if the mixing process is effected by melting; if the ethylene/vinyl acetate copolymers are to be used for pasty mixtures, products containing more than 40% by weight of vinyl acetate should again be used; furthermore, copolymers containing more than 45% by weight of vinyl acetate are recommended for solutions in styrene, to which solid polyesters or highly concentrated polyester solutions can then be added.

However, whilst ethylene copolymers containing more than approx. 60% by weight of vinyl acetate are soluble in the polyester/monomer systems and therefore produce the undesirably high viscosity already mentioned above, copolymers containing less than approx. 60% by weight of vinyl acetate, though soluble in copolymerisable monomers, precipitate as a gel on addition of the polyester and coagulate and form a clearly visible sedimented second phase so that they are unsuitable for the production of systems which are stable on storage.

It has now been found, surprisingly, that the addition of finely divided ethylene copolymers of a certain composition, which are insoluble both in the copolymerisable compounds and in the polyesters at room temperature (25° C) give the storage-stable polymerisable dispersions according to the invention. These dispersions are suitable for the manufacture of moulding materials which can be cured with little shrinkage and for forming mouldings free from surface deposits, and which, because of their low viscosity (which as a rule is less than 2,500 cP, preferably less than 1,000 cP, measured according to DIN 53,015 at 25° C) can be conveyed without difficulty and can take up exceptionally high amounts of fillers. They furthermore offer all the advantages of a one-component resin. The dispersions according to the invention fullfil all practical requirements in a hitherto unknown manner; in particular, the perfect nature of the surfaces and uniform colouration of the mouldings produced are particularly good.

The subject of the present invention is polymerisable organic dispersions which are suitable for the production of moulding compositions comprising I. 5 – 76% by weight of $\alpha,\beta$-ethylenically unsaturated polyesters, II. 20 – 70% by weight of copolymerisable compounds and III. 4 – 25% by weight of ethylene copolymers which copolymers have in turn been produced in an aqueous emulsion from a. 15 – 99% by weight, preferably 45 – 95% by weight, of ethylene, b. 1 – 20% by weight, preferably 5 – 15% by weight, of unsaturated sulphonic acids, $\alpha,\beta$-unsaturated monocarboxylic acids or dicarboxylic acids with 2 to 8 C atoms, their esters, half-esters, optionally substituted amides or half-amides or salts or oxyethylated derivatives of these compounds, but preferably maleic acid half-esters or half-ester salts and c. 0 – 65% by weight, preferably 5 – 50% by weight, of further copolymerisable compounds.

The dispersions are suitably prepared by distribution by means of a simple stirring unit. Because of the low shear forces which have to be used, a rise in temperature in the system undergoing dispersion is avoided; the suspension obtained is sufficiently stable on storage but can be improved yet further by the use of dispersing agents. The ethylene copolymers are preferably admixed in the form of a finely divided powder, but any other form of addition is also possible.

The unsaturated polyesters I used in the dispersion according to the invention are prepared according to known processes by polycondensation of at least one $\alpha,\beta$-ethylenically unsaturated dicarboxylic acid with 4 or 5 carbon atoms usually or its ester-forming derivatives, optionally mixed with up to 90 mol%, based on the unsaturated acid component, of at least one saturated aliphatic dicarboxylic acid with 4 to 10 carbon atoms usually or a cycloaliphatic or aromatic dicarboxylic acid with 8 to 10 carbon atoms usually or its ester-forming derivatives, with at least one polyhydroxy compound, especially dihydroxy compounds with 2 to 8 carbon atoms, i.e. polyesters as described by J. Bjorksten et al "Polyesters and their Applications," Reinhold Pub. Corp. New York 1956. Examples of unsaturated dicarboxylic acids or their derivatives to be used preferentially are maleic acid or maleic anhydride and fumaric acid. However it is also possible to use, for example, mesaconic acid, citraconic acid, itaconic acid or chloromaleic acid. Examples of the aromatic, cycloaliphatic or saturated aliphatic dicarboxylic acids or their derivatives which are used are phthalic acid or phthalic anhydride, isophthalic acid, terephthalic acid, hexahydrophthalic acid or tetrahydrophthalic acid or their anhydrides, endomethylenetetrahydrophthalic acid or its anhydride, succinic acid or succinic anhydride and succinic acid esters and chlorides, adipic acid and sebacic acid. In order to produce resins of low inflammability it is also possible to use, for example, hexachloroendomethylenetetrahydrophthalic acid (Het-acid), tetrachlorophthalic acid or tetrabromophthalic acid. Flame resistance can also be obtained by the addition of halogen-containing compounds which are not co-condensed in the polyester, such as, for example, chloroparaffin. Polyesters to be used preferentially contain maleic acid units, of which up to 25 mol% can be replaced by phthalic acid or isophthalic acid units. Examples of dihydric alcohols which can be employed are ethylene glycol, 1,2-propanediol, 1,3-propanediol, diethylene glycol, dipropylene glycol, 1,3-butanediol, 1,4-butanediol, neopentyl glycol, 1,6-hexanediol, perhydrobisphenol and others. Ethylene glycol, 1,2-propanediol, diethylene glycol and dipropylene glycol are used preferentially.

Further modifications are possible by the incorporation of up to 10 mol%, based on the alcohol component or acid component, of monohydric and more than dihydric alcohols, such as butanol, benzylalcohol, cyclohexanol and tetrahydrofurfuryl alcohol, trimethylolpropane and pentaerythritol and of monoallyl ethers, diallyl ethers and triallyl ethers and benzyl ethers of trihydric and polyhydric alcohols according to DT-AS (German Published Specification) 1,024,654, as well as by the incorporation of monobasic acids such as benzoic acid, oleic acid, linoleic acid and ricinenic acid.

The preferred polyesters must have a high degree of crosslinking since they are moulded, and released from the mould, at high temperatures (140° to 160°) and must therefore have a correspondingly high heat distortion point.

The acid numbers of the polyesters should be between 1 and 50, preferably between 5 and 25, the OH numbers should be between 10 and 100, preferably between 20 and 50, and the molecular weight should be between approx. 500 and 10,000, preferably between approx. 700 and 3,000 (up to values of 5,000 measured by vapour pressure osmosis in dioxane and acetone; if the values differ from each other, the lower one is taken to be the more accurate one; above values of 5,000 measured by membrane osmosis in acetone).

Suitable copolymerisable compounds II for use in the dispersions of the invention are the unsaturated compounds customary in polyester technology, which preferably carry $\alpha$-substituted vinyl groups or $\beta$-substituted allyl groups, preferably styrene, but also, for example, nuclear-chlorinated and nuclear-alkylated styrenes, wherein the alkyl groups can contain 1 to 4 carbon atoms, such as, for example, vinyltoluene, divinylbenzene, $\alpha$-methylstyrene, tert.-butylstyrene and chlorostyrenes; vinyl esters of carboxylic acids with 2 – 6 carbon atoms, preferably vinyl acetate; vinylpyridine, vinylnaphthalene, vinylcyclohexane, acrylic acid and methacrylic acid and/or their esters with 1 – 4 carbon atoms in the alcohol component, their amides and nitriles, maleic anhydride, maleic acid half-esters and diesters with 1 – 4 carbon atoms in the alcohol component, maleic acid half-amides and diamides or cyclic imides such as N-methylmaleimide or N-cyclohexylmaleimide; allyl compounds, such as allylbenzene and allyl esters such as allyl acetate, allyl acrylate, allyl methacrylate, phthalic acid diallyl ester, isophthalic acid diallyl ester, fumaric acid diallyl ester, allyl carbonates, diallyl carbonates, triallyl phosphate and triallyl cyanurate.

The ethylene copolymers III which have been prepared in aqueous emulsion and are to be used for the dispersions according to the invention may be converted to powders in known manner by coagulation and subsequent drying, preferably by spray drying. Using this method it proves particularly advantageous to dispense with the use of additional emulsifiers, in order to achieve polyester dispersions which do not form surface deposits; the stability of the dispersion can be maintained sufficiently well by increasing the constituent III (b) within the scope of the abovementioned limits.

Emulsifiers may be employed in the polymerisation of the component III, to achieve additional stabilisation, and it is possible to use the commercially available alkylsulphonates or fatty acid salts, preferably those with 10 to 20 C atoms in the alkyl radical, as well as, for example, nonionic emulsifiers based on polyethylene oxide. "Oil-soluble" emulsifiers have proved particularly advantageous, that is to say auxiliaries which are completely soluble in component I, component II or in a mixture of both components at room temperature, for example mixed polyethers which represent etherification products of alkanols with 10 to 20 C atoms and polyethylene oxides with 3 to 15 ethylene oxide units per molecule, oxyethylated alkylsulphonamides with 6 to 20 C atoms in the alkyl radical or polyether-esters which can be prepared from saturated or unsaturated fatty acids with 6 to 20 C atoms and polyethylene oxides with 1 to 30 ethylene oxide units.

Suitable components III b are unsaturated sulphonic acids and $\alpha,\beta$-unsaturated monocarboxylic acids and dicarboxylic acids with 2 to 8 C atoms, their esters and half-esters with 1 to 30, preferably 6 to 18, C atoms in the alcohol component, their optionally substituted amides and half-amides and the salts of these derivatives. Acrylic acid, methacrylic acid and crotonic acid may be mentioned as examples of $\alpha,\beta$-unsaturated carboxylic acids, maleic acid, fumaric acid and itaconic acid as examples of α,β-unsaturated dicarboxylic acids and vinylsulphonic acid and N-alkylsulphonic acid-substituted acrylic acid amides as examples of unsaturated sulphonic acids. Preferred examples are maleic acid half-esters and half-ester salts, especially maleic acid monooctyl ester, monododecyl ester and monocyclohexyl ester. In this context, the taurides are also to be regarded as amides. Difunctional dicarboxylic acid derivatives are unsuitable unless at least one functional group carries a hydrophilic end. Exceptions are oxyethylated derivatives, that is to say those of which the alcohol components are polyethylene oxides with 2 to 50, preferably 5 to 20, ethylene oxide units and a terminal hydroxyl, alkoxy or aryloxy radical. Oxyethylated monocarboxylic acids are as suitable as N-oxyethylated unsaturated monocarboxylic acid amides or dicarboxylic acid amides.

The free carboxyl group of the dicarboxylic acid monoderivatives is preferably neutralised by inorganic or organic bases; the sodium, potassium and ammonium salts may be mentioned as examples of inorganic salts and the salts of the primary, secondary and tertiary aliphatic and aromatic amines, (for example of triethylamine, ethanol amine, triethanolamine, pyridine and quinoline) may be mentioned as examples of organic salts. The neutralisation of the free carboxyl groups can be carried out before, during or after the polymerisation reaction of the components I – III; however, it is advisable to carry out the formation of the salt in the aqueous phase at any point in time before coagulation of the component III or before spray drying of this component.

Copolymers III to be used preferentially are prepared from (a) 80 – 99% by weight of ethylene and (b) 1 – 20% by weight of maleic acid half-esters or half-ester salts.

For further surface improvement of the mouldings which can be prepared from the dispersions according to the invention it is frequently advantageous to copolymerise further copolymerisable compounds III (c) with ethylene and the maleic acid half-esters. Almost all the compounds mentioned above under II are suitable for this purpose.

Terpolymers III to be used preferentially are prepared from (a) 25 – 95% by weight of ethylene, (b) 3 – 20% by weight of maleic acid half-esters or half-ester salts and (c) 2 – 65% by weight of vinyl acetate.

The melt indices of the shrinkage-reducing additives, measured according to DIN 53,735 at 125° C and 2.16 kp load lie in the range from values corresponding to no flow to 1,000; grades with melt indices between 0.1 and 20 are used preferentially.

The addition of dispersing agents has an advantageous influence on the stability of the dispersions.

Particularly effective dispersing agents are high molecular polymers which are soluble in copolymerisable compounds or in unsaturated polyesters or in solutions of the polyesters in the copolymerisable compounds. Very particularly preferred dispersing agents are ethylene/vinyl acetate copolymers which preferably contain 60 to 99% by weight, in special cases 65 – 75% by weight of vinyl acetate and have a Mooney viscosity of at least 15, preferably of 40 to 50, Mooney, measured according to DIN 53,523 (L-4), or polyvinyl acetates.

Further suitable dispersing agents are polyacrylic or polymethacrylic acid ester homopolymers and copolymers which contain 1 to 24 C atoms in the alcohol component, such as, for example, polyacrylic acid decyl ester, or copolymers of ethylene, containing up to 60% by weight of ethylene, with acrylic acid esters or methacrylic acid esters which contain 1 to 24 C atoms in the alcohol component, or with vinyl esters of organic monocarboxylic or dicarboxylic acids with 1 to 19 C atoms, or with their saponification products. Further very good dispersing agents are graft polymers with polyethylene or the polymers mentioned as the graft substrate.

Further suitable dispersing agents are polyethers, such as polyethylene oxide, polypropylene oxide and copolymers of these two compounds, ethoxylated saturated and unsaturated fatty acids with 4 to 30, preferably with 6 to 19 C atoms, their esters which contain 1 to 24 C atoms in the alcohol component, their amides and nitriles, fatty alcohols with 1 to 30, preferably with 4 to 16, C atoms, saturated polyesters of aliphatic or aromatic dicarboxylic acids and monohydric or polyhydric alcohols with molecular weights which are preferably below 10,000, or graft polymers in which these polymers are the graft substrate, such as are described, for example, in DT-AS (German Published Specification) 1,137,554.

Suitable graft monomers are vinyl-aromatics, such as vinyltoluene, α-methylstyrene, tert.-butylstyrene and chlorostyrenes, but preferably unsubstituted styrene itself; vinyl acetate, acrylic acid and methacrylic acid, their nitriles and esters, of which the alcohol component can contain 1–18 C atoms, such as, for example, methyl methacrylate or ethyl acrylate, acrylonitrile and methacrylonitrile, maleic anhydride and maleic acid half-esters and diesters with 1–30, preferably 4 to 16, C atoms in the alcohol component. Of course it is also possible to use mixtures of the compounds listed both as graft substrates and as graft monomers.

Further suitable dispersing agents are cellulose derivatives such as methylcellulose, ethylhydroxycellulose or cellulose esters, for example cellulose acetate, cellulose acetopropionate, cellulose acetobutyrate or nitrocellulose.

Sometimes, the introduction of water, which may, for example, be dissolved in the dispersing agent, cannot be avoided entirely when preparing the dispersion. Frequently, however, this is not a disadvantage; on the contrary, small amounts of water are frequently added deliberately since the stability of the dispersion can be improved by this measure. The finished synthetic resin system may contain up to 5% by weight of water; however, as a rule, the water content is less than 1% by weight.

The dispersing agents are added in a concentration of 0.001 to 20% by weight, preferably of 0.5 – 3% by weight, based on the finished dispersion.

To prevent undesired premature polymerisation of the polymerisable dispersion it is advisable to add 0.001 – 0.1% by weight of polymerisation inhibitors or antioxidants to the dispersion already during manufacture. Examples of suitable auxiliaries of this type are phenols or phenol derivatives, preferably sterically hindered phenols, which contain alkyl substituents with 1 – 6 C atoms in both o-positions relative to the phenolic hydroxyl group, amines, preferably secondary arylamines and their derivatives, quinones, copper salts of organic acids, addition compounds of copper-(I) halides with phosphites, such as, for example, 4,4'-bis-(2,6-di-tert.-butylphenol), 1,3,5-trimethyl-2,4,6-tris-(3,5-di-tert.-butyl-4-hydroxy-benzyl)-benzene, 4,4'- butylidene-bis-(6-tert.-butyl-m-cresol), 3,5-di-tert.-butyl-4-hydroxy-benzyl-phosphonic acid diethyl ester, N,N'-bis-(β-naphthyl)-p-phenylenediamine, N,N'-bis-(1-methylheptyl)-p-phenylenediamine, phenyl-β-naphthylamine, 4,4'-bis-(α,α-di-methylbenzyl)-diphenylamine, 1,3,5-tris-(3,5-di-tert.-butyl-4-hydroxy-hydrocinnamoyl)hexahydro-s-triazine, hydroquinone, p-benzoquinone, toluhydroquinone, p-tert.-butylpyrocatechol, chloranil, naphthoquinone, copper naphthenate, copper octoate, Cu(I)Cl/triphenyl phosphite, Cu(I)Cl/trimethyl phosphite, Cu(I)Cl/trischloroethyl phosphite, Cu(I)Cl/tripropyl phosphite, and p-nitrosodimethylaniline. Further suitable stabilisers are described in "Methoden der organischen Chemie" ("Methods of Organic Chemistry") (Houben-Weyl), 4th edition, volume XIV/1, pages 433–452, 756, Georg Thieme Verlag, Stuttgart, 1961. For example, p-benzoquinone, used in a concentration of 0.01 to 0.05% by weight, based on the finished dispersion is very suitable.

The dispersions according to the invention have the particular advantage of being insoluble at room temperature in the copolymerisable compounds II, for example styrene, and that finely divided, homogeneous dispersions of these copolymers in the polyester solutions have a very low viscosity in copolymerisable compounds. Furthermore, mouldings prepared from these dispersions, and which contain the customary additives, show excellent gloss, very good shrinkage values and outstandingly uniform colour distribution.

The dried powders can, as already described, be distributed homogeneously, by stirring, in a mixture of polyesters and copolymerisable compounds. Such a solids suspension has exceptional advantages in processing, since it has viscosities below 2,500 cP, at times below 1,000 cP, measured according to DIN 53,015 at 25° C, and permits the incorporation of high amounts of fillers into the dispersion.

The use of fine thermoplastic powders of very low particle size is a prerequisite. The average particle size is generally adequate for the field of use if it is below 30 μ. If the requisite particle size distribution is not achieved, the suspension is not adequately stable on storage, since the thermoplastic powder creams up.

The initiation of the polymerisation reaction can be triggered with the aid of water-soluble and/or styrene-soluble radical-forming agents, also in the presence of reducing agents, or by UV rays, α-rays, β-rays, γ-rays or X-rays.

Radical-forming agents, preferably organic peroxides, are used as polymerisation initiators. The dispersions according to the invention contain customary amounts, preferably 0.1 to 0.5% by weight, based on the sum of compounds I – III, of polymerisation initiators. Examples of suitable initiators are diacyl peroxides, such as diacyl peroxide, dibenzoyl peroxide and di-p-chlorobenzoyl peroxide, peroxy-esters such as tert.-butyl peroxyacetate, tert.-butyl peroxybenzoate, dicyclohexyl peroxydicarbonate, alkyl peroxides such as bis-(tert.-butylperoxybutane), dicumyl peroxide, tert.-butyl cumyl peroxide, hydroperoxides such as cumene hydroperoxide, cyclohexanone hydroperoxide, methyl ethyl ketone hydroperoxide and tert.-butyl hydroperoxide, ketone peroxides such as acetylacetone peroxide, or azoisobutyrodinitrile. However, inorganic radical-forming agents, such as, for example, hydrogen peroxide and potassium peroxydisulphate or ammonium peroxydisulphate can also be used. When using the hot-press process, for example, one or more layers of glass fibre mat or glass fibre fabric or a preform of glass fibres are introduced into a heated steel tool, the liquid dispersion mixed with the peroxide is poured on top and then the tool is closed by means of a press, whereupon moulding and polymerisation take place. Equally, the dispersion can be processed further by means of the profile-drawing method, wherein glass fibre slivers are impregnated with the liquid dispersion containing the peroxide and are subsequently passed through a die in which moulding and curing are effected. Of course, adjuvants such as, for example, fillers and/or pigments can be added in amounts of up to 300% by weight, based on the sum of the components I – III.

The resin mats or moulded compositions produced by means of the dispersion according to the invention are as a rule moulded at temperatures between 120° C and 180° C and pressures between 30 and 150 kp/cm$^2$; however, they can also be cold-cured in the presence of accelerators and reducing agents and can also be processed by the injection moulding process, on conventional injection moulding machines.

The mouldings produced from the dispersion according to the invention have a smooth, flawless surface of exceptionally high surface gloss. A particular advantage is the fact that in contrast to customary resins which can be cured with little shrinkage, the articles in question can be coloured homogeneously. Since the whitening effect which occurs when curing customary resins being resins which can be cured with little shrinkage, does not arise (compare DT-OS (German Published Specification) 1,694,857), it is also possible to produce darkcoloured articles without the occurrence of the lightening of the colour shade or of the marbling which is otherwise usual. Even sizable mouldings of large surface area do not distort. Because of the high heat distortion point of the polyester resins, mouldings produced from the dispersion according to the invention can be lacquered by the processes customary in the automobile industry.

Because of the outstanding properties of the polymerisable dispersions according to the invention, mouldings produced from them can be used for diverse purposes. The use in the automobile industry may be mentioned by way of example. In such use, because of the low shrinkage and the excellent surface quality, it is now possible to produce bodywork components without sink marks becoming visible on the outside, opposite the fixing tabs provided on the inside. Furthermore, it is a particular advantage, for this use, that the articles are dimensionally stable and can be lacquered by the stoving process. It is now also possible, when using the dispersion according to the invention, to manufacture large light housings free from distortion, and with dimensional accuracy. The use of the dispersions according to the invention in the manufacture of furniture is particularly interesting. Here, the outstanding surface quality and the homogeneous colouration, even in the case of dark colour shades, is an advantageous feature.

EXAMPLES

The percentages indicated in the text which follows are % by weight.

The polyester A used in the examples which follow is a condensation product of 31% by weight of 1,2-propanediol, 17% by weight of di-1,2-propanediol, 40% by weight of maleic anhydride and 12% by weight of phthalic anhydride, which has an acid number of 30 and has been prepared by heating to 210° C for 10 hours. The resulting polyester was dissolved in styrene, with addition of 0.02% by weight of hydroquinone, to give a 65% strength by weight solution having a dynamic viscosity of 1,500 cP, measured according to DIN 53,015 at 20° C (= polyester resin solution A).

A product prepared as follows was used as the ethylene polymer B: 2,000 ml of water, 3.5 g of sodium carbonate, 111 g of maleic acid monododecyl ester, 24 g of ethanolamine and 7 g of ammonium peroxydisulphate were initially introduced into a 5 l stirred autoclave. The mixture was heated to 75° C, ethylene was injected until the pressure reached 180 atmospheres gauge, the mixture was stirred for 1 hour and a solution of 14 g of sodium carbonate and 28 g of ammonium peroxydisulphate in 900 ml of water was then added over the course of 4 hours. The ethylene pressure was then raised to 200 atmospheres gauge and stirring was continued for 7 hours at 75° C. A latex having a solids content of 35% and a pH value of 8 was obtained and was converted to the form of a powder by spray drying. 1,380 g of reaction product having a maleic acid monododecyl ester salt content of 9.2% were obtained. The melt index, measured according to DIN 53,753 at 125° C and 2.16 kp load, was 12.6 [g/10 mins.].

A product prepared as follows was used as the ethylene polymer C: 2,000 ml of water, 5.1 g of sodium bicarbonate, 111 g of maleic acid monodecyl ester, 17.4 g of sodium hydroxide, 7 g of ammonium peroxydisulphate and 36 ml of vinyl acetate were initially introduced into a 5 l stirred autoclave. The mixture was heated to 75° C and ethylene was injected until the pressure reached 180 atmospheres gauge. After 1 hour, a solution of 20 g of sodium bicarbonate and 28 g of ammonium peroxydisulphate in 900 ml of water was added over the course of 4 hours, simultaneously with 144 ml of vinyl acetate. The ethylene pressure was then raised to 200 atmospheres gauge and the mixture was stirred at 75° C for a further 7 hours. A latex having a solids content of 23% and a pH value of 6 was obtained. After spray drying, 750 g of a copolymer having a vinyl acetate content of 19.8%, a maleic acid monodecyl ester salt content of 14.6% and an ethylene content of 65.6% were obtained. The melt index, measured according to DIN 53,753 at 125° C and 2.16 kp load, was 6.3 [g/10 mins.].

The ethylene polymer D used was a product prepared as follows: 1,800 ml of water, 15 g of boron trioxide, 15 g of sodium dihydrogen phosphate, 4 g of ammonium peroxydisulphate 42 g of vinyl acetate and 18 g of ADS-Na

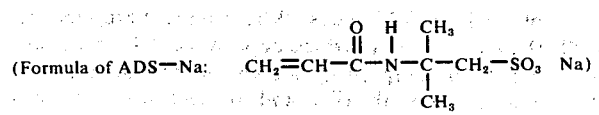

(Formula of ADS-Na)

were initially introduced into a 3 l stirred autoclave. The mixture was heated to 80° C and ethylene was injected at 300 atmospheres gauge. After 4 hours, the pressure was released from the autoclave and the latex, which had a solids content of 35% by weight and a pH value of 5.5, was spray-dried. 480 g of reaction product were obtained. The ethylene/vinyl acetate/ADS-Na terpolymer contains 7.8% by weight of vinyl acetate, 3.7% by weight of ADS-Na and 88.5% by weight of ethylene. The melt index, measured according to DIN 53,753 at 125° C and 2.16 kp load, was 0.8 (9/10 mins.). The average particle size of the thermoplastic powder was about 15 μ.

"Paraplex P 340" is an unsaturated polyester resin of Messrs. Rohm and Haas, Philadelphia, which contains maleic acid radicals and propylene glycol radicals (65% strength solution in styrene). Acid number 20; OH number: 34; viscosity of a 65% strength solution in styrene: approx. 1,000 cP, measured according to DIN 53,015 at 25° C.

"Paraplex 681" is a polymethyl methacrylate (30% strength solution in styrene) of Messrs. Rohm and Haas, Philadelphia. Acid number: 7.

A mixture of 60% of "Paraplex P 340" and 40% of "Paraplex P 681" corresponds to the designation "Paraplex P 19 C."

"Paraplex P 713" is a slightly modified polystyrene (30% strength solution in styrene) of Messrs. Rohm and Haas, Philadelphia.

A mixture of 60% of "Paraplex P 340" and 40% of "Paraplex P 713" corresponds to the designation "Paraplex P 19 P."

Product 4,270 of Messrs. Glidden is an unsaturated polyester resin (73% strength solution in styrene) which contains 0.8 mol of propanediol radicals and 0.2 mol of dipropylene glycol radicals per mol of maleic acid radicals. Acid number: 30; OH number: 46.

Product 7,105 of Messrs. Glidden is a slightly modified polystyrene (25% strength solution in styrene).

1st Example (Comparison experiment)

A resin mat coloured dark brown (colour shade: RAL 8,015) was produced from an unsaturated polyester resin, in accordance with the following recipe:

| | |
|---|---|
| Polyester resin solution A | 100 parts by weight |
| Filler (calcium carbonate, Durcal 5, a commercially available product from Messrs. Omya) | 100 parts by weight |
| Zinc stearate | 4 parts by weight |
| Tert.-butyl perbenzoate, 95% strength | 0.75 part by weight |
| Red iron oxide, Bayer 130 B | 3.35 parts by weight |
| Black iron oxide, Bayer F 318 | 1.65 parts by weight |
| Magnesium oxide (Marmag, a commercially available product from Messrs. Merck) | 1.5 parts by weight |

A glass fibre mat (Vetrotex M 612) was impregnated with the mixture. The resulting resin mat had a glass content of 26 – 28%. The resin mat was ripened for 7 days at 25° C. Thereafter, it had a dry surface; the polyethylene film could easily be pulled off.

2nd Example (Comparison experiment)

A resin mat coloured dark brown was produced, in accordance with Example 1, from a commercially available polyester resin which can be cured with little shrinkage. Instead of 100 parts by weight of polyester resin solution A, 100 parts by weight of a mixture (= Paraplex P 19 C) of 60% of Paraplex P 340 and 40% of Paraplex P 681 were used. The two components were mixed beforehand by means of a high speed stirrer and then had to be processed further very rapidly since the emulsion formed started to demix after only approx. 10 minutes. After a ripening time of 8 days the resin mat had a dry surface; the polyethylene film could be pulled off easily.

3rd Example (Comparison experiment)

A resin mat coloured dark brown was produced, in accordance with Example 1, from a commercially available polyester resin which can be cured with little shrinkage. Instead of 100 parts by weight of polyester resin solution A, a mixture (= Paraplex 719 P) of 60 parts by weight of Paraplex P 340 and 40 parts by weight of Paraplex P 713 was used. The mixture produced from the two components with the aid of a high speed stirrer had to be processed further very rapidly since it began to demix after only approx. 15 minutes. After 7 days' ripening time, the resin mat had a tacky surface. The polyethylene film was very difficult to pull off, tore easily and pulled threads.

4th Example (Comparison experiment)

A dark brown resin mat was produced, in accordance with Example 1, using a commercially available polyester resin which can be cured with little shrinkage. Instead of polyester resin solution A, a mixture of 50 parts of 7,015 and 50 parts by weight of 4,270 (commercially available products from Messrs. Glidden) was employed. The emulsion prepared from the two components with the aid of a high speed stirrer was unstable and began to demix after approx. 30 minutes. The resin mat produced therefrom had a tacky, thread-pulling surface after 7 days' ripening time. The polyethylene film was very difficult to pull off and tore easily.

5th Example

A polyester resin which can be cured with little shrinkage was prepared in accordance with the following recipe:

| | |
|---|---|
| Polyester resin solution A | 60 parts by weight |
| Styrene | 28 parts by weight |
| Ethylene polymer B | 12 parts by weight |
| Hydroquinone | 0.03 part by weight |

The ethylene polymer powder B had a particle diameter of 5 – 40 micrometres. It was mixed with the polyester resin solution A and with the styrene by 15 minutes stirring with the aid of a simple paddle stirrer. The resulting dispersion was stable on storage for at least 10 days. A resin composition coloured dark brown was prepared therefrom, in accordance with Example 1, using 100 parts by weight of the abovementioned mixture instead of 100 parts by weight of polyester resin solution A. After 7 days' ripening time, the resin mat had an absolutely dry, non-tacky surface. The polyethylene film could be pulled off extremely easily.

6TH EXAMPLE

A resin which could be cured with little shrinkage and which contained the ethylene polymer powder C instead of B as an additive to reduce shrinkage was prepared in accordance with Example 5. The powder had a particle diameter of between 2 and 20 micrometres. The resulting dispersion was stable on storage for at least 10 days. A resin composition coloured dark brown, which contained 100 parts by weight of the mixture described above instead of polyester resin solution A, was prepared therefrom in accordance with Example 1. After 7 days' ripening time, the resin mat had an absolutely dry, non-tacky surface. The polyethylene film could be pulled off extremely easily.

7TH EXAMPLE

A resin which could be cured with little shrinkage and which contained the ethylene polymer powder D instead of B as an additive to reduce shrinkage was prepared in accordance with Example 5. The resulting dispersion was stable on storage for at least 10 days. A resin composition coloured dark brown was prepared therefrom in accordance with Example 1. After 7 days' ripening time, the resin mat had an absolutely dry, non-tacky surface. The polyethylene film could be pulled off very easily.

8TH EXAMPLE

Panels and "sheets with ribs and projections" were produced from the resin mats prepared according to Example 1 – 7, in metal moulds at a press temperature of 140° C. The press pressure was 30 km/cm$^2$ in the case of the panels and 150 kp/cm$^2$ in the case of the sheets with ribs and projections.

Assessment

The mouldings obtained from the resin mat according to Example 1 showed a rough matt surface which exhibited a pronounced glass fibre structure, waviness due to sliding of the material, and flow lines. Deep sink marks were observable on the smooth side of the sheet with ribs and projections. The panels were severely distorted. The colouration was a homogeneous dark brown. The linear shrinkage was 0.28%.

The mouldings from the resin mat according to Example 2 showed a relatively smooth surface with a matt gloss, but disturbed by a pronounced glass fibre structure. Slight sink marks were visible on the smooth side of the sheet with ribs and projections. The colouration was absolutely inhomogeneous, marbled and invaded by light and dark patches. Even in the darkest patches the colour was far lighter than in the case of the mouldings from the resin mat according to Example 1. The linear shrinkage was 0.15%.

The mouldings from the resin mat according to Example 3 had an almost perfect, glossy and smooth surface with only a slight glass fibre structure, which was only disturbed by a few slight shrinkage patches. Only slight sink marks were detectable on the sheet with ribs and projections. The colouration was almost homogeneous, slightly cloudy, but markedly lighter than that of the mouldings from the resin mat according to Example 1. The linear shrinkage was 0.09%.

The mouldings from the resin mat according to Example 4 showed a smooth glossy surface with a glass fibre structure, which however was disturbed by large, blurred, matt blotches. Where there were blotches on the mouldings, a surface deposit was left on the mould, which built up progressively on repeated moulding. The sheet with ribs and projections showed pronounced sink marks on the smooth side. The linear shrinkage was 0.19%.

The pressings from the resin mat according to Example 5 showed a perfect surface which exhibited no sink marks even in the areas of thicker material in the sheet with ribs and projections. The extremely high gloss was conspicuous. The colouration was homogeneous and its depth of colour corresponded to the mouldings from the resin mat according to Example 1. No surface deposit appeared on either the mouldings or the mould. The linear shrinkage was 0.025%.

The mouldings from the resin mat according to Example 6 had the same very glossy surface as the mouldings from the resin mat according to Example 5. They again showed an extremely high surface gloss and no sink marks in areas where the material was thicker. They were also homogeneous and deep dark brown in colour. The linear shrinkage was 0%.

The mouldings from the resin mat according to Example 7 had a perfect, very glossy surface entirely free from surface deposits. No sink marks were visible in areas where the material was thicker. The colour of the mouldings was homogeneous and deep dark brown. The linear shrinkage was 0.013%.

We claim:

1. A composition comprising
   I. 5–76% by weight of an $\alpha,\beta$-ethylenically unsaturated polyester,
   II. 20–70% by weight of an ethylenically unsaturated copolymerizable monomer and
   III. 4–25% by weight of an ethylene copolymer derived from
      a 15–99% by weight of ethylene,
      (b) 1–20% by weight of an unsaturated sulfonic acid, an $\alpha,\beta$-unsaturated monocarboxylic or dicarboxylic acid having 2 to 8 carbon atoms, an ester, half ester, amide or half amide of one of said acids, a salt thereof or an oxethylated derivative thereof and
      c 0–65% by weight of an ethylenically unsaturated copolymerizable monomer.

2. The composition of claim 1 including a polymerization initiator, a polymerization inhibitor and a dispersing agent.

3. The composition of claim 1 wherein said ethylene copolymer III is produced in an aqueous emulsion.

4. The composition of claim 1 wherein III is an ethylene/vinyl acetate copolymer based on
   a. 25–95% by weight of ethylene,
   b. 3–20% by weight of maleic acid half ester or half ester salt and
   c. 2–65% by weight of vinyl acetate.

5. A dispersion of the composition of claim 1 wherein the ethylene copolymer III, in the form of a powder, is homogeneously distributed in a solution of $\alpha,\beta$-ethylenically unsaturated polyester I and ethylenically unsaturated copolymerizable monomer II.

* * * * *